United States Patent [19]

Motohashi et al.

[11] Patent Number: 5,479,822
[45] Date of Patent: Jan. 2, 1996

[54] CASING FOR A VIBRATORY GYROSCOPE

[75] Inventors: Shozo Motohashi; Katsumi Fujimoto; Hiroshi Nishiyama; Yoshiaki Heinouchi; Kazuhiro Yoshitani; Yukio Sakashita, all of Nagaokakyo, Japan

[73] Assignee: Murata Manufacturing Co., Ltd., Kyoto, Japan

[21] Appl. No.: 135,332

[22] Filed: Oct. 13, 1993

[30] Foreign Application Priority Data

Oct. 16, 1992 [JP] Japan ................................ 4-304842

[51] Int. Cl.$^6$ ................................ G01P 15/08; G01P 1/02
[52] U.S. Cl. ................................ 73/504.14; 73/431
[58] Field of Search ................................ 73/505, 493, 510, 73/431, 497, 517 R; 310/316, 321, 329

[56] References Cited

U.S. PATENT DOCUMENTS

4,898,031  2/1990  Oikawa et al. ................................ 73/505

Primary Examiner—Hezron E. Williams
Assistant Examiner—Helen C. Kwok
Attorney, Agent, or Firm—Nikaido, Marmelstein, Murray & Oram

[57] ABSTRACT

A vibratory gyroscope 10 includes a vibrator 12. The vibrator 12 includes a regular triangular prism-shaped vibrating body 14. On centers of the three side faces of the vibrating body 14, piezoelectric elements 16a, 16b and 16c are formed respectively. The vibrating body 14 is supported above a base plate 20 by supporting members. The vibrating body 14 vibrates vertically with no rotation. A case 22 is secured so as to cover the vibrating body 14. An upper portion 26 of the case 22 is so formed that its inner size in the direction of the width is shorter than a half-wave length of a sound wave of a vibrating frequency of the vibrating body 14.

2 Claims, 8 Drawing Sheets

CASING FOR A VIBRATORY GYROSCOPE

BACKGROUND OF THE INVENTION

1. Field of the Invention

The present invention relates to a vibratory gyroscope, and particularly, to a vibratory gyroscope which is used, for example, in a system for protecting an unsteady hold mounted on a VTR camera or the like.

2. Description of the Prior Art

Figure 11:
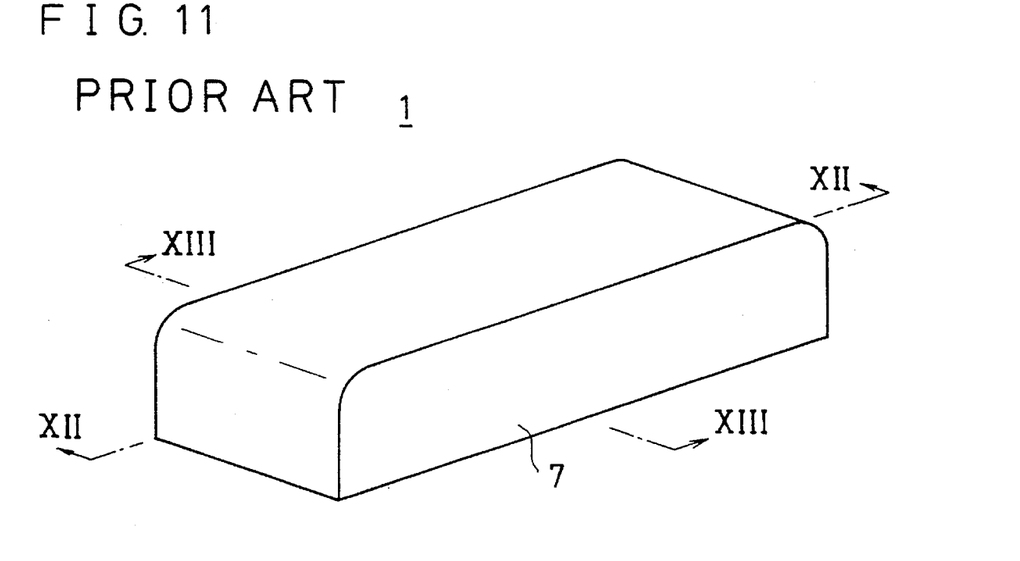
FIG. 11 is a perspective view showing an example of a conventional vibratory gyroscope.
Figure 12:
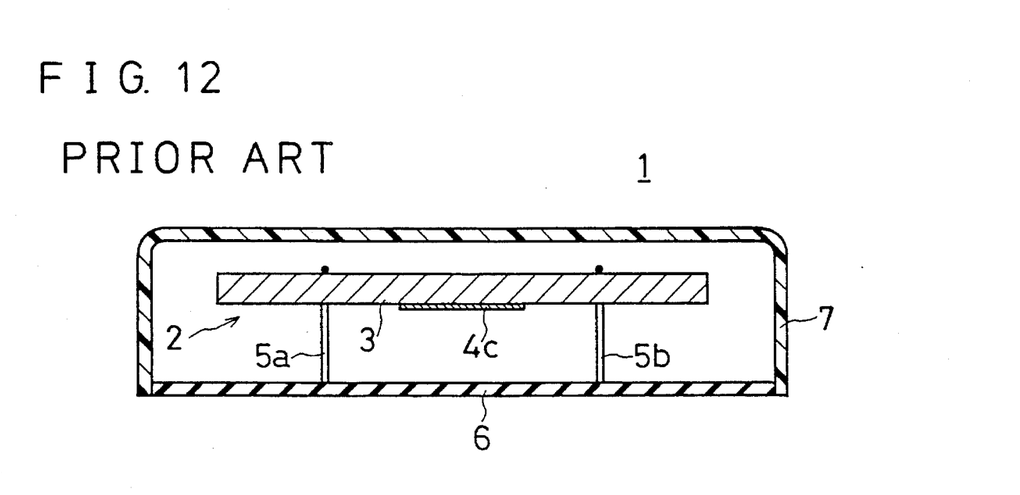
FIG. 12 is a sectional view taken along the line XII— XII of FIG. 11.
Figure 13:
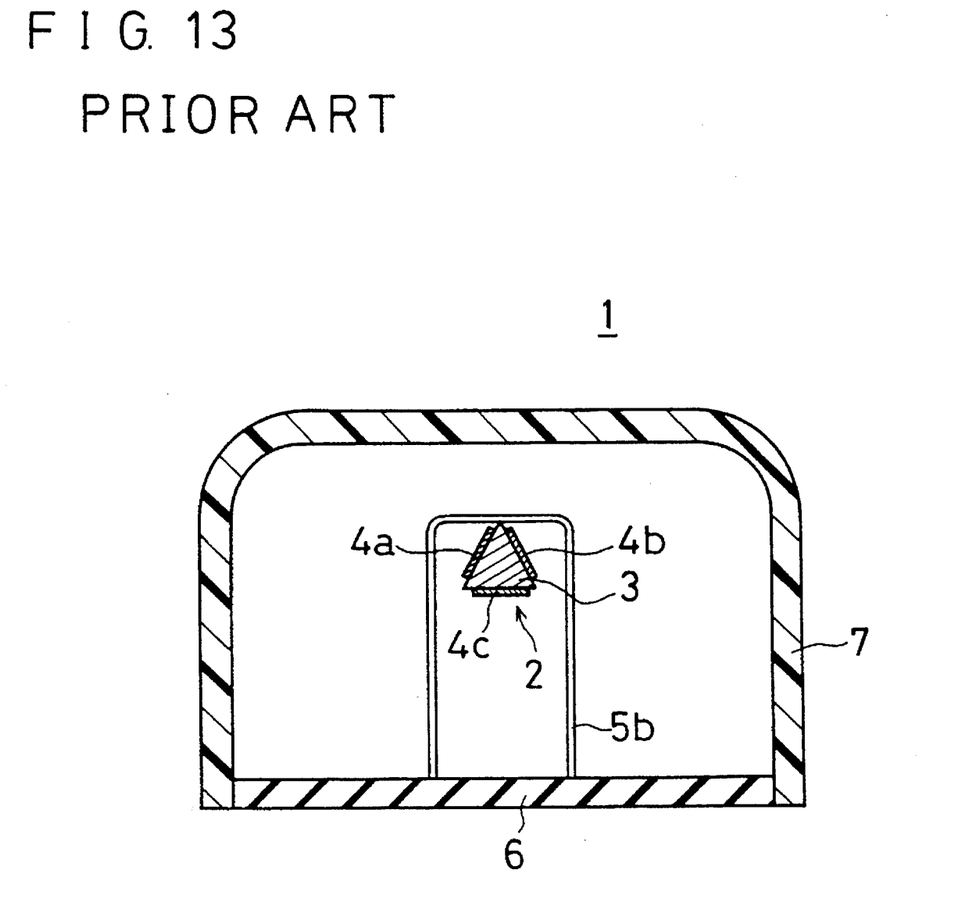
FIG. 13 is a sectional view taken along the line XIII—XIII of FIG. 11.

FIG. 11 is a perspective view showing an example of a conventional vibratory gyroscope, FIG. 12 is a sectional view taken along the line XII—XII of FIG. 11, and FIG. 13 is a sectional view taken along the line XIII—XIII of FIG. 11. As specifically shown in FIGS. 12 and 13, the vibratory gyroscope 1 comprises a vibrator 2. The vibrator 2 comprises a regular triangular prism-shaped vibrating body 3. On centers of three side faces of the vibrating body 3, piezoelectric elements 4a, 4b and 4c are formed respectively. The vibrating body 3 is supported above a base plate 6 of 6.7 mm×20.4 mm in a plan view by two supporting members 5a and 5b. Furthermore, a box type case 7 of 6.7 mm width, 20.4 mm length and 5 mm height in inner sizes is fixed to the base plate 6 so as to cover the vibrating body 3 and so on. The case 7 is to protect the vibrating body 3 and so on from an outside effect.

In the vibratory gyroscope 1, upper two piezoelectric elements 4a and 4b are used for driving and detecting, lower one piezoelectric element 4c is used for feedback. When an output from the feedback piezoelectric element 4c is supplied to the driving and detecting piezoelectric elements 4a and 4b, the vibrating body 3 bends and vibrates vertically at about 25.5 kHz. In this case, the vibrating body 3 bends and vibrates forming its longitudinal center portion into an antinodal point, and two portions supported by the supporting members 5a and 5b into nodal points.

In this state, when the vibratory gyroscope 1 is rotated about the axis of the vibrating body 3 as a rotation axis, the vibrating direction of the vibrating body 3 is changed by a Coriolis force to a direction which is orthogonal to the axial direction of the vibrating body 3 but not a vertical direction. Thus, an output difference responsive to the rotational angular velocity is produced between the two driving and detecting piezoelectric elements 4a and 4b. The rotational angular velocity is detected by the output difference.

However, in the vibratory gyroscope 1 shown in FIGS. 11–13, a half-wave length of a sound wave of a vibrating frequency of the vibrating body 3 is almost equal to the inner size 6.7 mm in the width of the case 7, depending upon an environmental temperature on some occasions. That is, at an environmental temperature of about 20° C. the sound velocity is about 430 m/sec., thus the half-wave length of the sound wave of about 25.5 kHz of the vibrating frequency of the vibrating body 3 becomes about 6.7 mm. In this case, at rotation of the vibratory gyroscope 1, the vibrating body 3 resonates with the case 7 to produce a standing wave, thereby its sensitivity rapidly changes. In this way, when the sensitivity of the vibratory gyroscope 1 rapidly changes, it becomes difficult to accurately detect the rotational angular velocity.

SUMMARY OF THE INVENTION

It is therefore a primary object of the present invention to provide a vibratory gyroscope wherein its sensitivity does not rapidly change against temperature change.

A vibratory gyroscope according to the present invention comprises a cylinder-shaped vibrating body, and a case covered the vibrating body, wherein in a direction a) which is orthogonal to a vibrating direction of the vibrating body at no rotation and b) is orthogonal to the axis direction of the vibrating body, at least an inner size of portions of the case opposed to the vibrating body is different from an integer multiple of a half-wave length of a sound wave of a vibrating frequency of the vibrating body.

In the direction which is orthogonal to the vibrating direction of the vibrating body at no rotation and which is orthogonal to the axis direction of the vibrating body, at least the inner size of the portions of the case opposed to the vibrating body is different from an integer multiple of the half-wave length of the sound wave of the vibrating frequency of the vibrating body, thus the vibrating body does not resonate with the case at rotation of the vibratory gyroscope even when the temperature changes, and its sensitivity does not rapidly change.

According to the present invention, a vibratory gyroscope wherein its sensitivity does not rapidly change against temperature change can be obtained. Thus, the vibratory gyroscope in accordance with the present invention can correctly detect a rotational angular velocity against temperature change.

The above and other objects, features, aspects and advantages of the present invention will become more apparent from the following detailed description of the embodiments with reference to the accompanying drawings.

DESCRIPTION OF THE PREFERRED EMBODIMENTS

Figure 1:
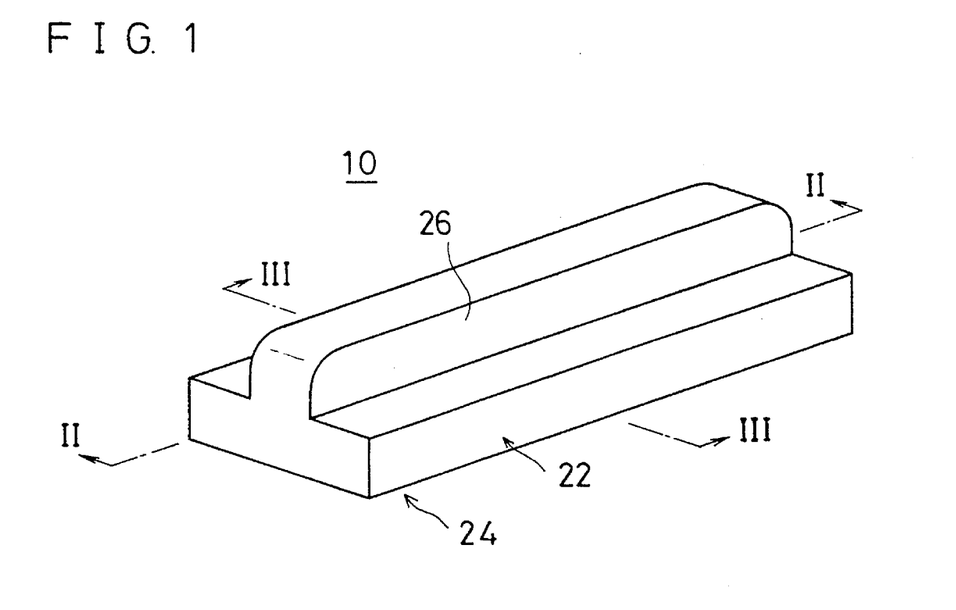
FIG. 1 is a perspective view showing one embodiment of the present invention.
Figure 2:
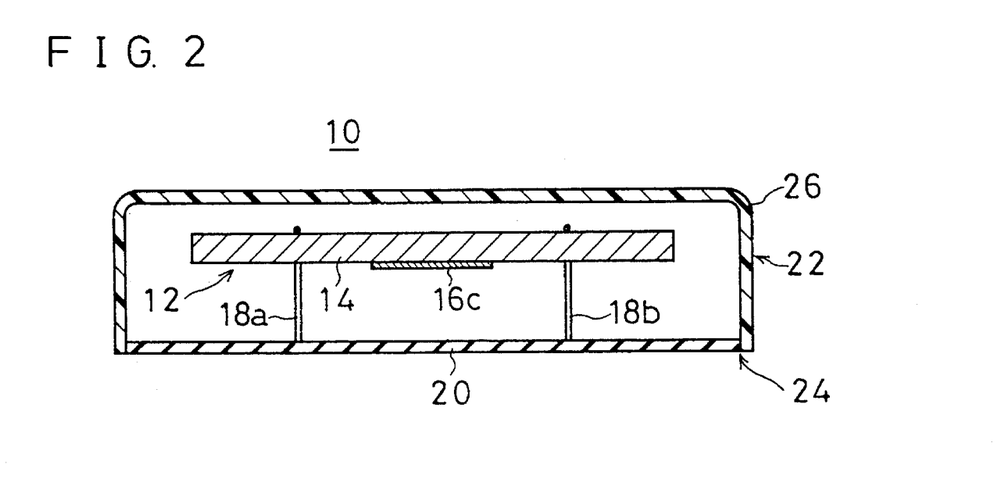
FIG. 2 is a sectional view taken along the line II—II of FIG. 1.
Figure 3:
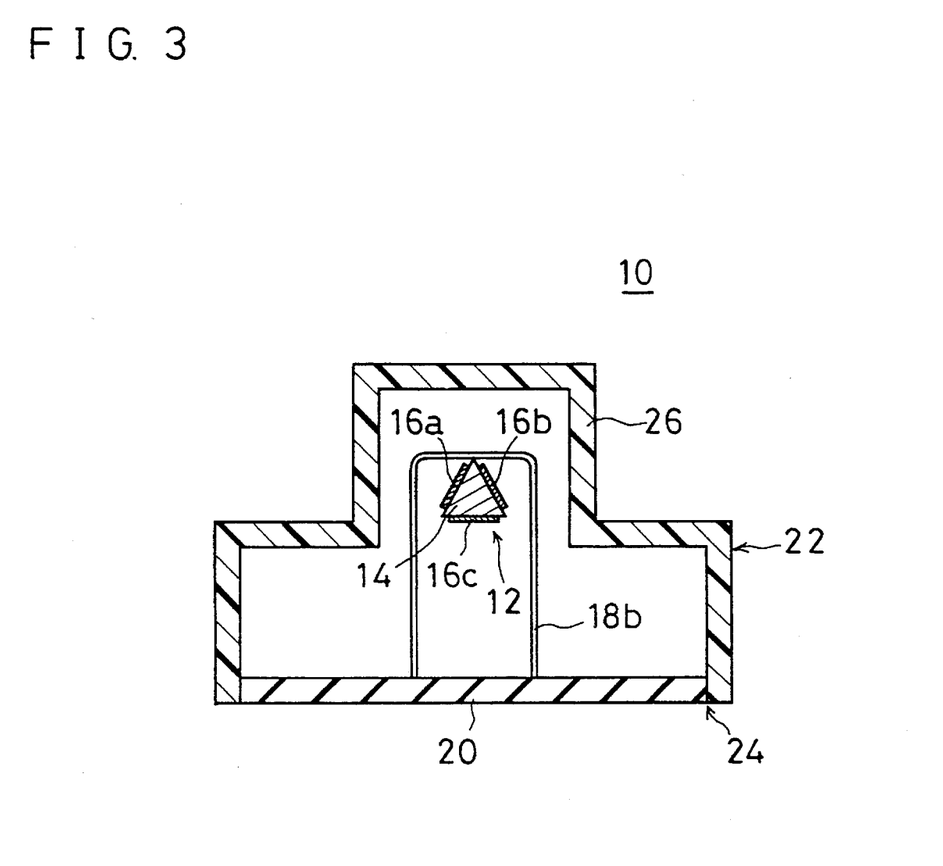
FIG. 3 is a sectional view taken along the line III—III of FIG. 1.

FIG. 1 is a perspective view showing one embodiment of the present invention, FIG. 2 is a sectional view taken along the line II—II of FIG. 1, and FIG. 3 is a sectional view taken along the line III—III of FIG. 1. As specification shown in FIGS. 2 and 3, the vibratory gyroscope 10 comprises a vibrator 12. The vibrator 12 comprises a regular triangular prism-shaped vibrating body 14. The vibrating body 14 is formed with a material which generally generates a mechanical vibration such as elinver, iron-nickel alloy, quartz, glass, crystal, ceramics and the like.

On centers of three side faces of the vibrating body 14, piezoelectric elements 16a, 16b and 16c are formed, respectively. Each of the piezoelectric elements 16a–16c includes a piezoelectric layer consisting of, for example, ceramics, and on both surfaces of the piezoelectric layer, electrodes are formed respectively. The electrodes are formed with an electrode material such as gold, silver, aluminum, nickel, copper-nickel alloy (Monel Metal) and the like, and by means of thin-film forming techniques such as sputtering and vacuum evaporation or by means of printing techniques depending on the material.

The vicinities of two nodal points of the vibrating body 14 are respectively supported by U-shaped supporting members 18a and 18b consisting of, for example, a metal wire. Center portions of the supporting members 18a and 18b are respectively secured to the vicinities of the two nodal points of the vibrating body 14, by welding or by bonding with a conductive paste. End portions of the supporting members 18a and 18b are secured to one surface of a base plate 20 of, for example, 6.7 mm×20.4 mm in a plan view.

In the vibrator 12, upper two piezoelectric elements 16a and 16b are used for driving and detecting, lower one piezoelectric element 16c is used for feedback. When an output from the feedback piezoelectric element 16c is amplified and supplied as a driving signal to the driving and detecting piezoelectric elements 16a and 16b, the vibrating body 14 bends and vibrates, and the same wave forms are output from the piezoelectric elements 16a and 16b. In this case, the vibrating body 14 bends and vibrates vertically at about 25.5 kHz. In this state, when the vibrator 12 is rotated about its axis as a rotation axis, the vibrating direction of the vibrating body 14 is changed to a direction which is orthogonal to the axis of the vibrating body 14 but not vertical, an output from one driving and detecting piezoelectric element becomes larger according to the rotational angular velocity, and conversely, an output from the other driving and detecting piezoelectric element becomes smaller according to the rotational angular velocity. Therefore, the rotational angular velocity can be detected by a difference between the outputs from the driving and detecting piezoelectric elements 16a and 16b.

The vibrator 12 is covered with a case 22 consisting of, for example, synthetic resin. The case 22 has, in its bottom (i.e. inner portion), an opening portion 24 of the same inner size as the base plate 20. An upper portion 26 of the case 22 is formed into a small size in the direction of the width. In this embodiment, the upper portion 26 of the case 22 is so formed into a narrow size in the direction of the width that the inner size in the direction of the wide is, for example, a length of 3 mm. In the case 22, the opening portion 24 is adhered to the base plate 20 so as to cover the vibrator 12 with the upper portion 26.

In the vibratory gyroscope 10, in a direction a) which is orthogonal to the vibrating direction of the vibrating body 14 at no rotation or to the vertical direction and b) which is orthogonal to the axis direction of the vibrating body 14, an inner size of portions of the case 22 opposed to the vibrating body 14 is different from an integer multiple of a half-wave length of a sound wave of a vibrating frequency of the vibrating body 14, thus the vibrating body 14 does not resonate with the case 22 at rotation of the vibratory gyroscope even when temperature changes, and its sensitivity does not rapidly change. Thus, the vibratory gyroscope 10 can correctly detect a rotational angular velocity against temperature change.

Figure 4:
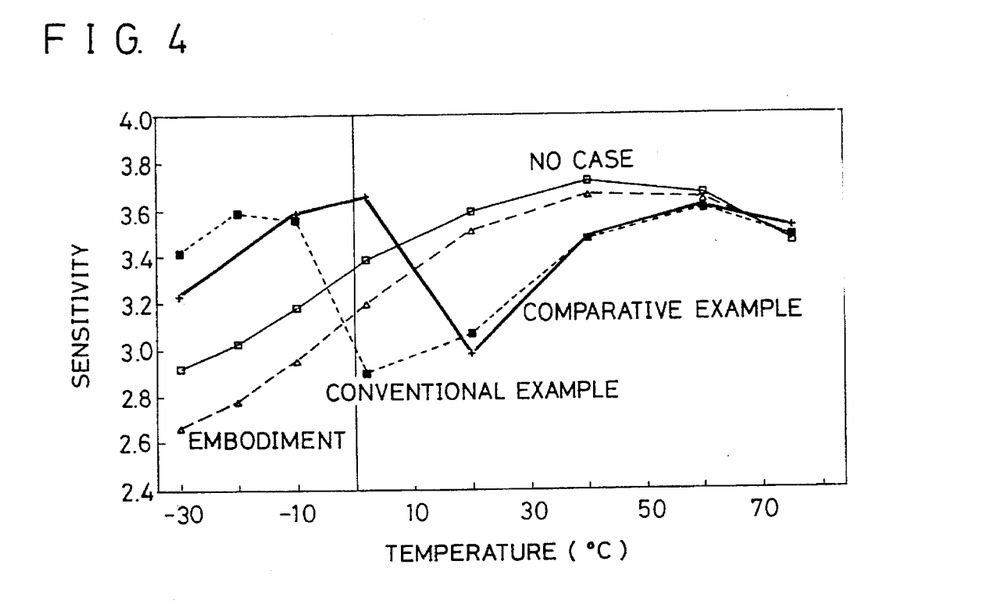
FIG. 4 is a graph showing characteristics of sensitivity change against temperature change in the embodiment of FIGS. 1–3, in the conventional example of FIGS. 11–13, in a comparative example having a case of an inner size extended in the direction of the width in the conventional example, and in a vibratory gyroscope having no case.

FIG. 4 is a graph showing characteristics of sensitivity change against temperature change in the embodiment of FIGS. 1–3, in the conventional example of FIGS. 11–13, in a comparative example having a case of an inner size extended into 6.8 mm in the direction of the width in the conventional example, and in a vibratory gyroscope having no case.

As can be seen from the graph shown in FIG. 4, in the conventional example and the comparative example, the sensitivities rapidly change against temperature change.

Figure 5:
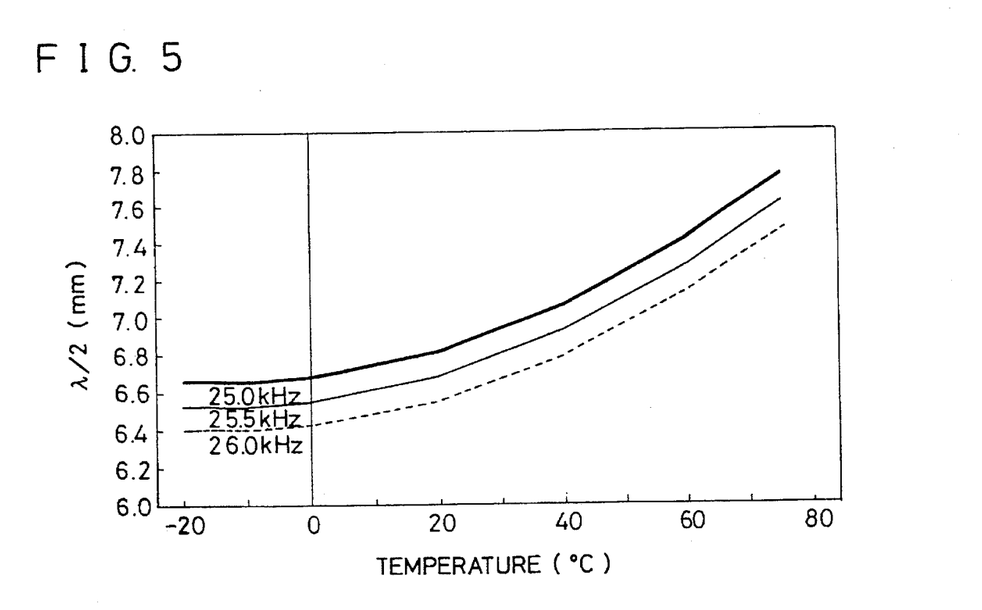
FIG. 5 is a graph showing relations between temperatures and half-wave lengths of sound waves on 25 kHz, 25.5 kHz and 26 kHz.

This is because in both the conventional example and the comparative example, the half-wave length of the vibrating frequency of the vibrating body is nearly equal to the inner size of the case in portions opposed to the vibrating body, as shown in Table 1 which shows the relations between temperatures T (°C.), sound velocities V (m/sec), and half-wave lengths λ/2 (mm) of sound waves on 25 kHz, 25.5 kHz, and 26 kHz, and as shown in FIG. 5 which shows the relations between temperatures (°C.) and half-wave lengths λ/2 (mm) of the sound waves on 25 kHz, 25.5 kHz and 26 kHz.

TABLE 1

| TEMPERATURE | SOUND VELOCITY | HALF-WAVE LENGTH λ/2 (mm) | | |
|---|---|---|---|---|
| T(°C.) | V (m/sec) | 25 kHz | 25.5 kHz | 26 kHz |
| −20 | 332.8 | 6.656 | 6.5254901 | 6.4 |
| −10 | 332.7 | 6.654 | 6.5235294 | 6.3980769 |
| 0 | 334.0 | 6.68 | 6.5490196 | 6.4230769 |
| 20 | 340.8 | 6.816 | 6.6823529 | 6.5538461 |
| 40 | 353.2 | 7.064 | 6.9254901 | 6.7923076 |
| 60 | 371.2 | 7.424 | 7.2784313 | 7.1384615 |
| 75 | 388.375 | 7.7675 | 7.6151960 | 7.46875 |

In addition, the sound velocities V (m/sec) and half-wave lengths λ/2 (mm) in Table 1 are obtained from the following equations (1) and (2), substituting temperatures T (°C.) and frequencies f (kHz) of sound waves.

$$V = 334 + 0.2 \times T + 0.007 \times T \times T \tag{1}$$

$$\lambda/2 = V/(2 \times f) \tag{2}$$

Further, as can be seen from the graph shown in FIG. 4, it is recognized that in the embodiment of FIGS. 1–3, the sensitivity does not rapidly change against temperature change similar to the vibratory gyroscope having no case.

Furthermore, in the embodiment, the upper portion 26 of the case 22 is formed into a narrow width as compared with the conventional example of FIGS. 11–13, thus the whole of the vibratory gyroscope can be miniaturized.

Figure 6:
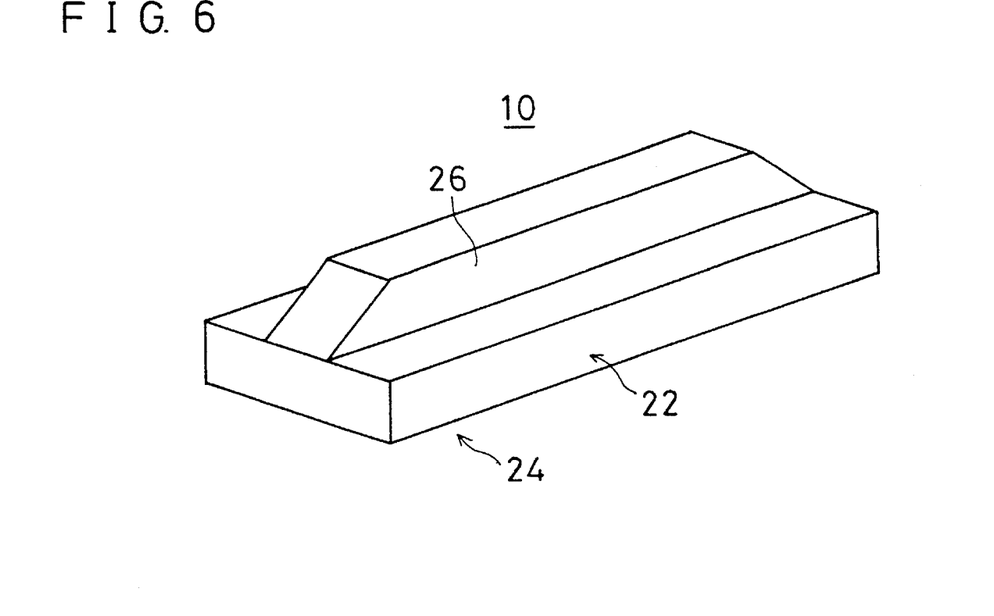
FIG. 6 is a perspective view showing a modification of the embodiment of FIG. 1.

FIG. 6 is a perspective view showing a modification of the embodiment of FIG. 1. In the embodiment of FIG. 1, the inside and outside faces of both longitudinal ends of the upper portion 26 of the case 22 are curved outward respectively, while, in the embodiment of FIG. 6, the inside and outside faces of both the longitudinal ends of the upper portion 26 of the case 22 are formed into inclined faces.

In the embodiment of FIG. 6, the sensitivity does not rapidly change against temperature change similar to the embodiment of FIG. 1, thus a rotational angular velocity can be correctly measured. Furthermore, in the embodiment of in FIG. 6, the whole of the vibratory gyroscope can be miniaturized as compared with the conventional example in FIGS. 11–13.

Figure 7:
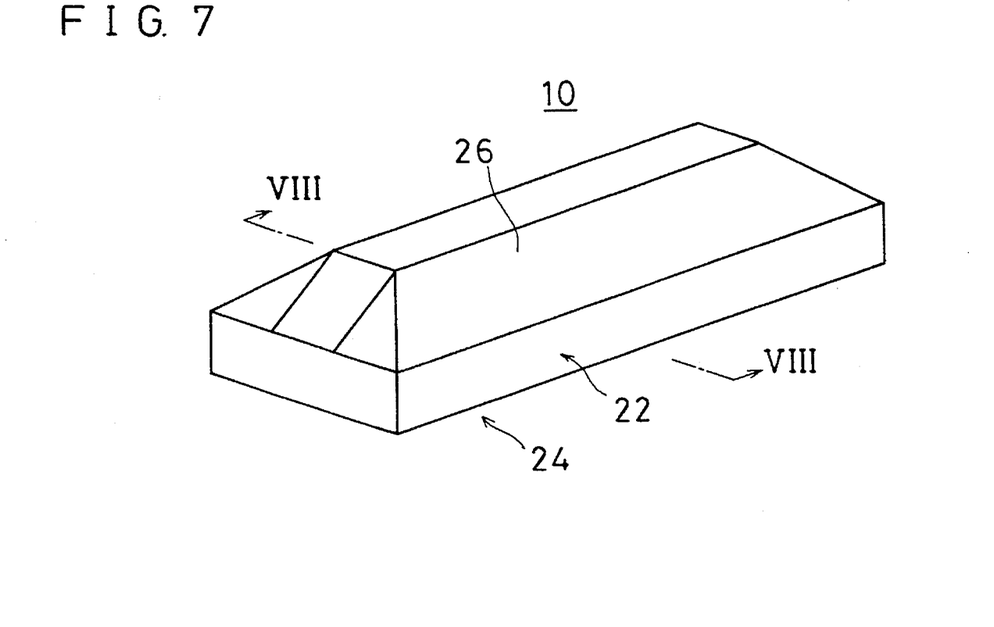
FIG. 7 is a perspective view showing a modification of the embodiment of FIG. 6.
Figure 8:
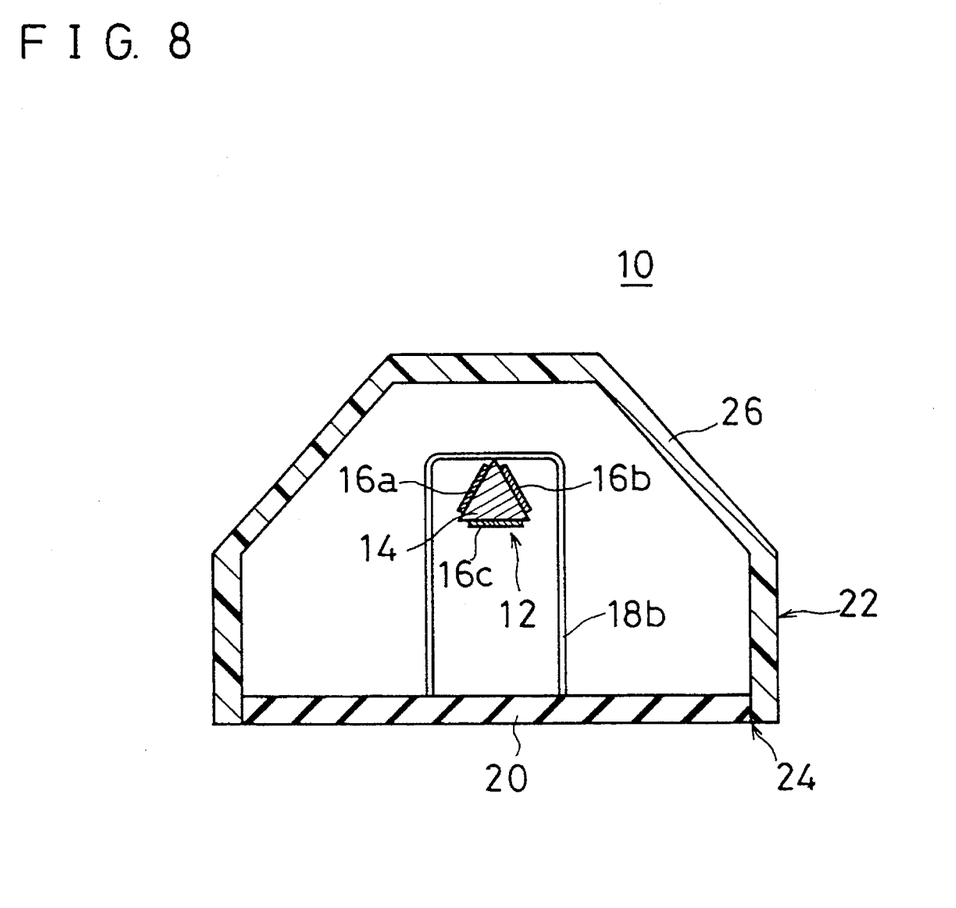
FIG. 8 is a sectional view taken along the line VIII— VIII of FIG. 7.

FIG. 7 is a perspective view showing a modification of the embodiment of FIG. 6, and FIG. 8 is a sectional view taken along the line VIII—VIII of FIG. 7. In the embodiment of FIGS. 7 and 8, the inside and outside faces of both the transversal ends of the upper portion 26 of the case 22 are especially formed into inclined faces as compared with the embodiment of FIG. 6.

In the embodiment of FIGS. 7 and 8, also the sensitivity does not rapidly change against temperature change, thus a rotational angular velocity can be correctly detected and the whole of the vibratory gyroscope can be miniaturized.

Figure 9:
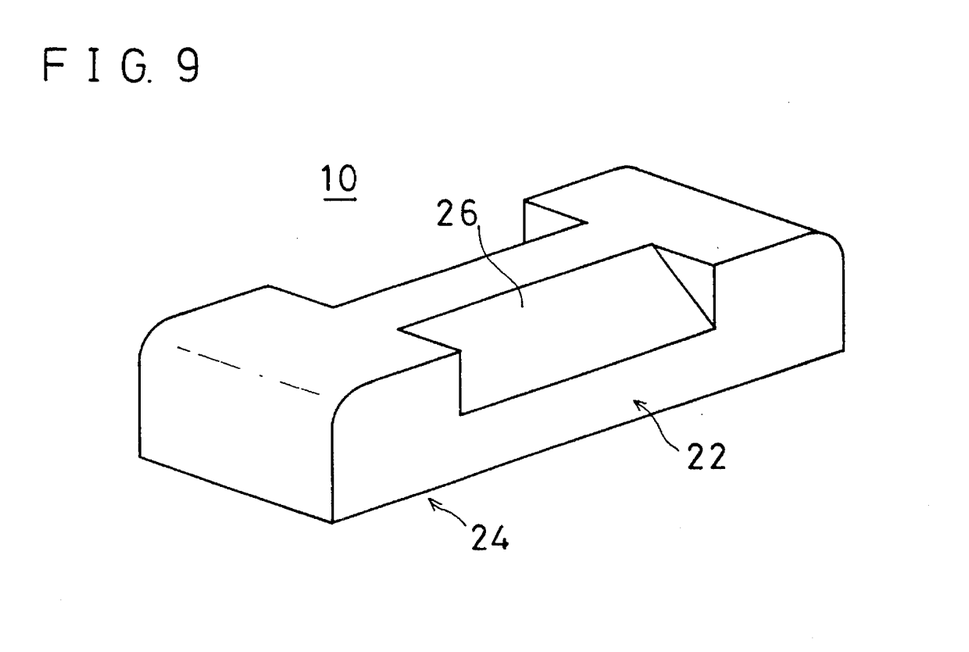
FIG. 9 is a perspective view showing another embodiment of the present invention.

FIG. 9 is a perspective view showing another embodiment of the present invention. In each embodiment mentioned above, the width portion of the upper portion 26 of the case 22 extending from one longitudinal end to the other longitudinal end is formed into a narrow width, however in the embodiment of FIG. 9, the inside and outside widths of only a longitudinal center portion of the upper portion 26 of the case 22 opposed to the vibrating body 14 are formed into narrow widths. In this case, in the longitudinal center portion of the upper portion 26 of the case 22, the inside and outside faces are formed into inclined faces respectively. In addition, in the embodiment of FIG. 9, the inside and outside faces of both the longitudinal ends of the upper portion 26 of the case 22 are curved outward respectively.

Also, in the embodiment of FIG. 9, the sensitivity does not rapidly change against temperature change, thus a rotational angular velocity can be correctly detected.

Figure 10:
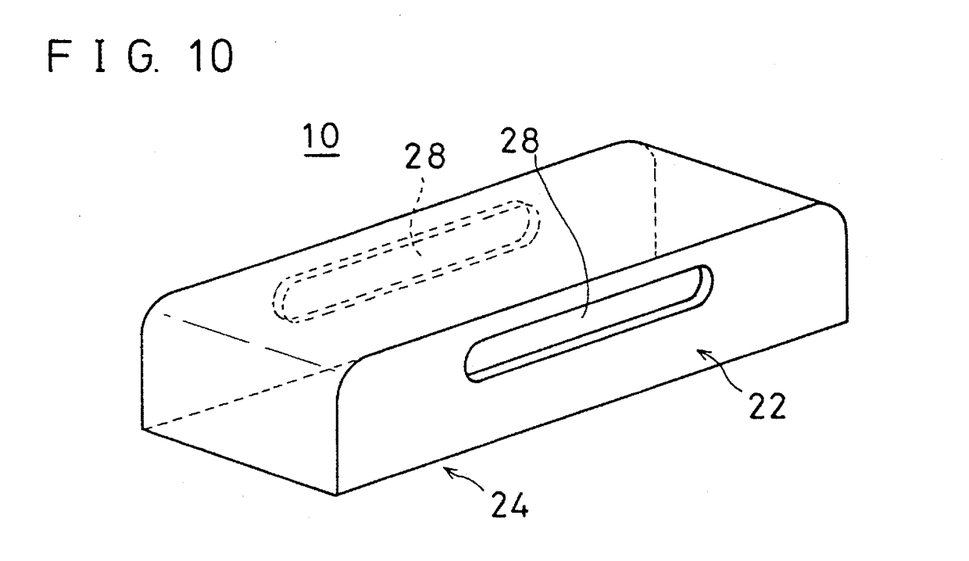
FIG. 10 is a perspective view showing still another embodiment of the present invention.

FIG. 10 is a perspective view showing still another embodiment of the present invention. In each embodiment mentioned above, the width of the upper portion 26 of the case 22 is formed into a narrow one, however in the embodiment of FIG. 10, only a width between both elliptic center portions 28 which include portions opposed to the vibrating body 14 in the direction of the width is formed into a narrow width in the case 22.

In the embodiment of FIG. 10, also the sensitivity does not rapidly change against temperature change, thus a rotational angular velocity can be correctly detected.

In addition, in each embodiment mentioned above, a regular prism-shaped vibrating body is used, however a circular cylinder-shaped vibrating body, a square prism-shaped vibrating body or another cylinder-shaped vibrating may be used in the present invention.

In addition, in each embodiment mentioned above, three piezoelectric elements are used, although only two piezoelectric elements for driving and detecting may be used, and a number of piezoelectric elements used may be optionally changed in the present invention.

Furthermore, in each embodiment mentioned above, in the direction of the width which is orthogonal to the vibrating direction of the vibrating body 14 at no rotation or to the vertical direction and which is orthogonal to the axis of the vibrating body 14, the inner size of the case 22 is made to be different from an integer multiple of the half-wave length of the sound wave of the vibrating frequency of the vibrating body 14. However, the inner size of the case in the vibrating direction of the vibrating body 14 at no rotation or the inner size of the case in the axial direction of the vibrating body 14 may be made to be different from an integer multiple of a half-wave length of a sound wave of a vibration frequency of the vibrating body 14. Particularly, if the inner size of the case 22 in the vibrating direction of the vibrating body 14 at no rotation is made to be different from an integer multiple of a half-wave length of a sound wave of a vibrating frequency of the vibrating body 14, though the output at no rotation is almost zero, and the sensitivity at no rotation does not rapidly change against temperature change.

In addition, in each embodiment mentioned above, the vibrating frequency of the vibrating body 14 is about 25.5 kHz, although the present invention can be applied to a vibratory gyroscope having a vibrating body vibrated at another frequency.

Though the vibrator and so on is enclosed with only the case in each embodiment mentioned above, the vibrator, the base plate and so on may be enclosed with only a case.

It will be apparent from the foregoing that, while the present invention has been described in detail and illustrated, these are only particular illustrations and examples, and the present invention is not limited to these. The spirit and scope of the present invention is limited only by the appended claims.

What is claimed is:

1. A vibratory gyroscope comprising:

a cylinder-shaped vibrating body; and a case to cover said vibrating body, said case having upper and lower portions, said upper portion being narrower in width than said lower portion, wherein in a direction a) which is orthogonal to a vertical direction of said vibrating body and b) which is orthogonal to an axis direction of said vibrating body, at least a length of said upper portion of said case, opposed to said vibrating body, is different from a length of an integer multiple of a half-wave length of a sound wave of a vibrating frequency of said vibrating body.

2. A vibratory gyroscope according to claim 1, wherein said vibrating frequency of said vibrating body is 25–26 kHz, and said length of said upper portion of said case is 3 mm.

* * * * *